(12) United States Patent
Cukurel

(10) Patent No.: US 12,736,007 B2
(45) Date of Patent: Sep. 15, 2026

(54) ULTRA-MICRO GAS TURBINE GENERATOR

(71) Applicant: TECHNION RESEARCH AND DEVELOPMENT FOUNDATION LIMITED, Haifa (IL)

(72) Inventor: Beni Cukurel, Kibbutz Nahsholim (IL)

( * ) Notice: Subject to any disclaimer, the term of this patent is extended or adjusted under 35 U.S.C. 154(b) by 10 days.

(21) Appl. No.: 17/792,151

(22) PCT Filed: Jan. 12, 2021

(86) PCT No.: PCT/IL2021/050037
§ 371 (c)(1),
(2) Date: Jul. 12, 2022

(87) PCT Pub. No.: WO2021/144791
PCT Pub. Date: Jul. 22, 2021

(65) Prior Publication Data

US 2023/0272742 A1 Aug. 31, 2023

(30) Foreign Application Priority Data

Jan. 13, 2020 (IL) ........................................ 272021

(51) Int. Cl.
*F02C 3/045* (2006.01)
*F01D 5/08* (2006.01)
(Continued)

(52) U.S. Cl.
CPC .............. *F02C 3/045* (2013.01); *F01D 5/085* (2013.01); *F01D 15/10* (2013.01); *F01D 25/12* (2013.01);
(Continued)

(58) Field of Classification Search
CPC ................................ F02C 3/045; F01D 5/085
See application file for complete search history.

(56) References Cited

U.S. PATENT DOCUMENTS 2,945,349 A * 7/1960 Ritzi ........................ F02C 3/05
60/737
5,271,711 A * 12/1993 McGreehan .......... F04D 29/321
415/115

(Continued)

FOREIGN PATENT DOCUMENTS

KR 101937770 B1 1/2019

OTHER PUBLICATIONS

Epstein, A. H. "Millimeter-scale, micro-electro-mechanical systems gas turbine engines", Journal of engineering for gas turbines and power vol. 126 No. 2 (2004): pp. 205-226.

(Continued)

*Primary Examiner* — Gerald L Sung
(74) *Attorney, Agent, or Firm* — AlphaPatent Associates Ltd.; Daniel J. Swirsky

(57) ABSTRACT

A novel structural arrangement for the various components of an Ultra-Micro Gas Turbine Generator, based on a single part impeller element which comprises the compressor, the turbine and the electrical generator core in a single annular structure, produced as a single piece by an additive manufacturing process. The single annular structure has a hollow shell structure, with a supporting structure within in. The internal hollow space of the shell structure provides for a flow of cooling air from the outside through the internal space, for cooling the turbine region of the impeller. This air flow could be assisted by the use of internal blades, which can also serve as the supporting structure to increase the strength of the shell structure. The air flow can either be ejected at the center of the turbine, or can provide a high pressure supply for air bearings of the impeller element.

21 Claims, 6 Drawing Sheets

(51) Int. Cl.

| | |
|---|---|
| ***F01D 15/10*** | (2006.01) |
| ***F01D 25/12*** | (2006.01) |
| ***F02K 1/00*** | (2006.01) |

(52) U.S. Cl.

CPC .......... *F02K 1/002* (2013.01); *F05D 2220/76* (2013.01); *F05D 2230/30* (2013.01); *F05D 2260/20* (2013.01)

(56) References Cited

U.S. PATENT DOCUMENTS

| | | | | |
|---|---|---|---|---|
| 5,454,222 | A | 10/1995 | Dev | |
| 6,866,478 | B2 | 3/2005 | Fabian et al. | |
| 8,920,128 | B2 * | 12/2014 | Matwey | F04D 29/285 60/785 |
| 10,465,603 | B1 * | 11/2019 | Sachdev | F01D 5/08 |
| 2003/0215323 | A1 | 11/2003 | Prinz et al. | |
| 2004/0016239 | A1 * | 1/2004 | Fabian | B33Y 70/00 60/805 |
| 2010/0300113 | A1 * | 12/2010 | Grewal | F01D 5/081 60/785 |
| 2012/0321439 | A1 * | 12/2012 | Maier | F16C 39/02 310/90.5 |
| 2013/0098061 | A1 * | 4/2013 | Matwey | F01D 5/085 60/785 |
| 2014/0125066 | A1 | 5/2014 | Baumgart | |
| 2014/0169971 | A1 * | 6/2014 | Vedula | F04D 29/023 416/185 |
| 2015/0275691 | A1 | 10/2015 | Colm et al. | |
| 2017/0022586 | A1 * | 1/2017 | Hardy | C22C 19/05 |
| 2018/0023576 | A1 * | 1/2018 | Kupratis | F04D 17/105 415/144 |
| 2019/0264612 | A1 * | 8/2019 | Brown | F01D 5/025 |
| 2020/0040739 | A1 | 2/2020 | Notarnicola et al. | |
| 2020/0300115 | A1 * | 9/2020 | Aurahs | F01D 5/085 |
| 2020/0400314 | A1 * | 12/2020 | Binek | F02C 7/16 |
| 2025/0251130 | A1 * | 8/2025 | Qiao | B33Y 80/00 |

OTHER PUBLICATIONS

Tanaka, S., Isomura, K., Togo, S. I., Esashi, M. “Turbo test rig with hydroinertia air bearings for a palmtop gas turbine.” Journal of Micromechanics and Microengineering vol. 14 No. 11 (2004): pp. 1449-1454.

Seo, Jeongmin, et al. “Development and experimental investigation of a 500-W class ultra-micro gas turbine power generator.” Energy 124 (2017): 9-18.

Peirs, J., Waumans, T., Vleugels, P., Al-Bender, F., Stevens, T., Verstraete, T., Vanden Braembussche, R. “Micropower generation with microgasturbines: a challenge.” Proceedings of the Institution of Mechanical Engineers, Part C: Journal of Mechanical Engineering Science vol. 221 No. 4 (2007): pp. 489-500.

Kang, S., Johnston, J. P., Arima T., Matsunaga, M., Tsuru, H., Printz, F. B. “Microscale radial-flow compressor impeller made of silicon nitride: manufacturing and performance.” Journal of engineering for gas turbines and power vol. 126 No. 2 (2004): pp. 358-365.

Dessornes, O., Landais, S., Valle, R., Fourmaux, A., Burguburu, S., Zwyssig, C., and Kozanecki, Z. “Advances in the Development of a Microturbine Engine.” Journal of engineering for gas turbines and power vol. 136 No. 7 (2014): p. 71201.

PCT International Search Report in international application No. PCT/IU050037, dated Apr. 21, 2021, 4 pages.

Extended European Search Report in patent application No. 21741847.4, dated Mar. 4, 2024, 5 pages.

* cited by examiner

ULTRA-MICRO GAS TURBINE GENERATOR

FIELD OF THE INVENTION

The present invention relates to the field of miniature gas turbine generators, especially ultra-miniature types for use as replacement for batteries.

BACKGROUND

The weight of portable electronic equipment, such as back-packed radio communication equipment, and the flight time of Micro Unmanned Aerial Vehicles (MAV) is highly dependent on achievable electric energy density, meaning the amount of electric energy that can be stored per kg mass. Therefore, industry, military and academic research have been striving to develop new technologies to enhance electric energy density of portable, rechargeable power sources. As a result, Ultra Micro Gas Turbines (UMGT) have been investigated for the last two decades, since they have the potential to increase energy density many-fold compared to the energy density of current Li-Ion batteries. Ultra Micro Gas Turbines for electric power production are based on the same thermodynamic principles as large stationary industrial gas turbines, which are made up of a compressor for collecting and compressing ambient air into the combustion chamber, where the air is mixed with fuel which burns to generate a high velocity flow of heated air, which flows across a turbine on the same shaft as the compressor, to produce mechanical shaft power which can be utilized by an electric generator. The present disclosure describes the opposite end of the scale of power outputs, where the power output levels range from several Watts up to 1 kW, with impeller diameters of approximately from 4 mm to 20 mm. Despite intensive research efforts during the last two decades, practical devices producing useful electric power output have not been successfully implemented. The main obstacles to this appear to have been:

1) manufacturing challenges related to the small scale of the UMGT,
2) small scale heat transfer effects, because of the physical closeness of the very hot parts of the turbine to elements that do not function efficiently at high temperatures, such as the compressor, which should be kept at as low a temperature as possible to increase efficiency, and
3) rotor-dynamic and bearing instabilities because of the very high rotational speeds, required to achieve good efficiency. Speeds of up to 500,000 rpm are generally required to ensure good efficiency.

In US Patent Application Publication No. 2003/0215323, for "Micro Gas Turbine Engine with Active Tip Clearance Control", to F. B. Prinz et al, there is shown a micro gas turbine engine. A special feature of this engine is a capacitive sensor for measuring a tip clearance of the radial compressor section, and an actuator for axially displacing a rotor shaft in response to an output from the capacitive sensor. This enables highly precise tip clearance control.

In US Patent Application Publication No. 2014/0125066, for "Micro Gas Turbine" to T. Baumgarten et al, there is shown a micro gas turbine having a compressor and a turbine, the rotors of which are arranged on a common driveshaft. The aim of the described system is to provide a lightweight and inexpensive micro gas turbine. One feature of this gas turbine is that the drive shaft is hollow, and is sealed off and filled with an evaporable coolant which evaporates on contact with the wall of the inner hollow space. As a result of the cooling medium evaporating, the turbine-side bearing is cooled.

The disclosures of each of the publications mentioned in this section and in other sections of the specification, are hereby incorporated by reference, each in its entirety.

SUMMARY

There exists a need for an Ultra Micro Gas Turbines generator which overcomes at least some of the disadvantages of prior art systems and methods. The present disclosure describes new exemplary devices and their construction methods, for the generation of electricity from UMGTs, of dimensions small enough to be considered as light weight power sources, which overcome at least the above three mentioned problems arising in prior art devices.

The present disclosure describes a novel structural arrangement for the various components of an UMGT generator, which largely overcomes the above mentioned disadvantages of current devices. The UMGT device is based on a single part, impeller geometry which comprises the compressor, the turbine and the electrical generator core in a single annular structure, produced as a single piece by an additive manufacturing process. The single annular structure could be a hollow shell structure, and it could have a supporting structure within in, with the internal space of the shell structure providing for a flow of cooling air through the internal space for cooling the turbine region of the impeller. This air flow could be assisted by the use of internal blades, which can also serve to increase the strength of the shell structure.

Additive manufacturing of turbomachinery for the scale and accuracy required of the UMGT devices proposed is available for a variety of metal and ceramic materials, offering great design freedom and economic production but is challenging due to the following reasons:

1. Support structures for holding the part being manufactured have to be avoided, since such support structures may reduce surface quality at the support positions, which may directly affect structural strength and part accuracy. Because of the very high rotational speeds involved, shape symmetry and accuracy is of great importance.
2. Layer-wise manufacturing methods such as Lithographic-based Ceramic Manufacturing (LCM) require a plane surface at the initially printed layers, by which to attach the part to the build plate.
3. During the sintering process of conventionally formed ceramic materials, cracks may occur due to agglomeration of material
4. Accurate assembly of small-scale parts is expensive, time-consuming and prone to errors.

All the above obstacles are overcome in the presently described UMGT devices, by the use of the single part, hollow impeller, with a turbine or compressor geometry having a cut-back extremity, such that it can be printed directly on the planar build plate. An additively manufactured impeller for the Ultra Micro Gas Turbine, as disclosed in this application, may have a number of characteristics which enable the above problems to be overcome. Firstly, since the entire impeller body is formed as a single part, no support or assembly elements need be involved. The hollow cavity structure has reduced the wall thickness in the compressor, turbine and generator shaft sections, thereby reducing impeller weight, and reducing thermal conduction from the hot turbine region to the other elements of the impeller, especially to the compressor region. Heat transfer effects from the turbine region to the compressor region have significant impact on compressor performance and pressure ratio. Therefore, the surface temperature of the compressor wheel needs to be kept low. By use of a thin-walled hollow impeller geometry, the heat conducting cross-section is reduced, directly leading to lower compressor surface temperature and hence promoting a more efficient thermodynamic cycle. Additionally, for ceramic additive manufacturing, the agglomeration of material is avoided, hence preventing cracks during de-binding and sintering.

The hollow impeller used in the various implementations of the UMGT of the present disclosure, also significantly contributes to improvement of the rotor-dynamic behavior of the UMGT. The main concern for such a thin-walled, high speed rotating device, is to avoid crossing the first bending mode of the impeller during start up and operation. Use of a hollow shaft structure enables mass to be reduced and hence an increase in the first bending mode frequency, contributing to stable operation at high speeds, far from the first bending mode frequency. This effect may be additionally improved by the added blade structures within the cavity, in axial or mixed axial-radial directions. The shape of the cavity and/or the blade structures can then be used to control the modal frequency of the device. By this means, modal behavior can be tailored to the operating conditions of the UMGT, which otherwise would be completely constrained by compressor, turbine and shaft geometry. Additionally, the internal blades or fins within the cavity volume not only enhance the impeller stiffness, but can also be configured to provide cooling air inflow and circulation.

Material selection for UMGT devices is significantly narrowed due to the high turbine inlet temperatures and stresses. Additive manufacturing technology for metals at a scale and resolution necessary for a UMGT is currently limited to materials which cannot withstand more than about 800° C. Furthermore, with conventional manufacturing technologies, active cooling of turbine blades has not been achieved for the small scale of the disclosed UMGT. As additive manufacturing allows the production of complex and accurate geometries within the cavity, thereby achieving the following features which overcome these challenges:

1. Flow profiles are generated within the cavity of the impeller which provide active cooling by creating suction flow from the outside environment into the cavity inlet and to the cavity outlet, or just within the cavity by the rotational motion of the flow profiles
2. Passive fin profiles within the cavity enhance heat transfer from the air flow resulting from cavity inlet to cavity outlet pressure differences.

Since turbine cooling reduces the blade temperature, stress demands on the material used are significantly eased. Moreover, the generator shaft, where the impeller bearings are situated, can be cooled, which is most important for stable bearing operation.

Aerostatic bearings can be used to operate the UMGT at high rotational speeds with high stability. However, aerostatic bearings require a high pressure air supply. In prior art UMGTs, such a compressed air source is established using an external source, which conflicts the requirement of a portable power source, or by using comparatively hot bleed air from the compressor. Therefore, the presently described UMGT configurations generate the high pressure supply for the air bearings by means of a screw compressor incorporated into the impeller of the gas turbine, in the form of a helical groove geometry within the hollow shaft of the impeller, generating high-pressure air compression in the cavity when the impeller is rotated. Additionally, outlet holes or porous sections in the cavity wall can be used, in combination with micro groves on the shaft or on the casing, to output the high pressure air into the air bearing spaces to support the impeller, or for cooling other facilities. Furthermore, outlet holes or porous sections in the turbine blades can be used to cool the turbine by a fluid film.

In gas turbine engines, thrust bearings are required to carry the axial load resulting from the axial force induced by the pressure difference between the compressor and the turbine. If the axial thrust is not compensated for, the axial forces are applied directly to the bearings, resulting in shortening of their useful lifetime. In the presently described devices, thrust compensation may be achieved by incorporating several magnets or a single sectioned magnet in the impeller shaft, such that at high speeds, an alternating magnetic field is established which induces eddy currents in a conductive stator positioned near the rotating magnet(s), leading to opposing magnetic fields to that of the rotating magnets, and hence to axial thrust compensation. The axial thrust compensation is proportional to the operating speed and hence also to the pressure difference of the gas turbine, which determines the operating speed, such that the thrust compensation can be made self-regulating.

There is thus provided in accordance with an exemplary implementation of the devices described in this disclosure, a gas turbine system, comprising:

(i) an impeller element having a shell structure including a compressor element and a turbine element, the impeller element being constructed of a single piece of material, (ii) at least one bearing configured to support the impeller element such that it can rotate about its axis, and (iii) a combustion chamber external to the impeller element, and adapted to receive a fuel/air mixture whose combustion product are adapted to be directed through the turbine, wherein the shell structure is adapted to enable flow of air from outside of the impeller element to pass through the impeller element.

In such a system, at least part of the flow of air from outside of the impeller element passing through the impeller element may be adapted to provide cooling to the turbine region of the impeller element. Additionally, at least part of the flow of air from outside of the impeller element passing through the impeller element may be emitted therefrom to provide cooling to at least one bearing on which the impeller element rotates. Furthermore, the shell structure may include support elements configured to provide mechanical strength to the structure while not significantly impeding air flow through the shell structure. In that case, the support elements may comprise a honeycomb filling with air flow spaces.

According to further implementations of the gas turbine systems of the present disclosure, the impeller element may further comprise an electricity generator core, such that the system can generate electricity.

Additionally, the system may further comprise an exhaust gas nozzle to generate directional thrust from the kinetic energy of exhaust flow from the turbine.

In yet other implementations of these gas turbine systems, the shell structure may have an array of blades formed internally, the blades being aligned such that the cooling air is circulated through the shell structure. In such a case, the blades may be positioned such that they also increase the stiffness of the shell structure. Furthermore, the shape of the cavity of the shell structure, and the position and geometry of the blades may be selected to control the modal frequency of the structure when rotated.

Any of the above described systems may further comprise a helical groove compressor formed within a shaft of shell structure, such that pressurized cooling air is pumped from outside through the shell structure. In that case, the at least one bearing may be an air bearing adapted to utilize the cooling air as its support medium.

In yet additional implementations of the above described gas turbine systems, the impeller element may further comprise at least one magnetic element, and a static conductive element disposed in close proximity to the at least one magnetic element, such that rotation of the impeller induces eddy currents in the static conductive element, causing compensation for axial forces generated by the rotating compressor and turbine.

In any of the above described systems, the hollow shell structure may be adapted to be generated by an additive manufacturing method. In such a case, the additive manufacturing method is enabled by planning the blades of the turbine element to have a planar end surface.

Additionally, the hollow shell structure may be constructed either of a ceramic material, or of a high-strength nickel alloy.

There is further provided in accordance with exemplary methods described in this disclosure, a method of forming elements of a gas turbine, the method comprising the forming of an impeller element comprising a turbine, a compressor and a hollow shell structure, the hollow shell structure enabling a flow of air from outside the impeller element to pass through the impeller element, wherein the impeller element is formed by an additive manufacturing method. In such a method, the hollow shell structure may be formed either of a ceramic material or of a high-strength nickel alloy. In such methods, the additive manufacturing method may be characterized by the impeller element having a planar end surface at the turbine end of the hollow shell structure.

Finally, in these methods, the turbine blades of the hollow shell structure may have a planar end surface, such that they can be formed on the planar build plate of an additive manufacturing apparatus.

It is to be understood that the use of the term adaptive manufacturing process or method throughout this disclosure, and as claimed, is intended to also include such processes described using other nomenclature, such as three-dimensional printing methods.

BRIEF DESCRIPTION OF THE DRAWINGS

The present invention will be understood and appreciated more fully from the following detailed description, taken in conjunction with the drawings in which.

DETAILED DESCRIPTION

Figure 1:
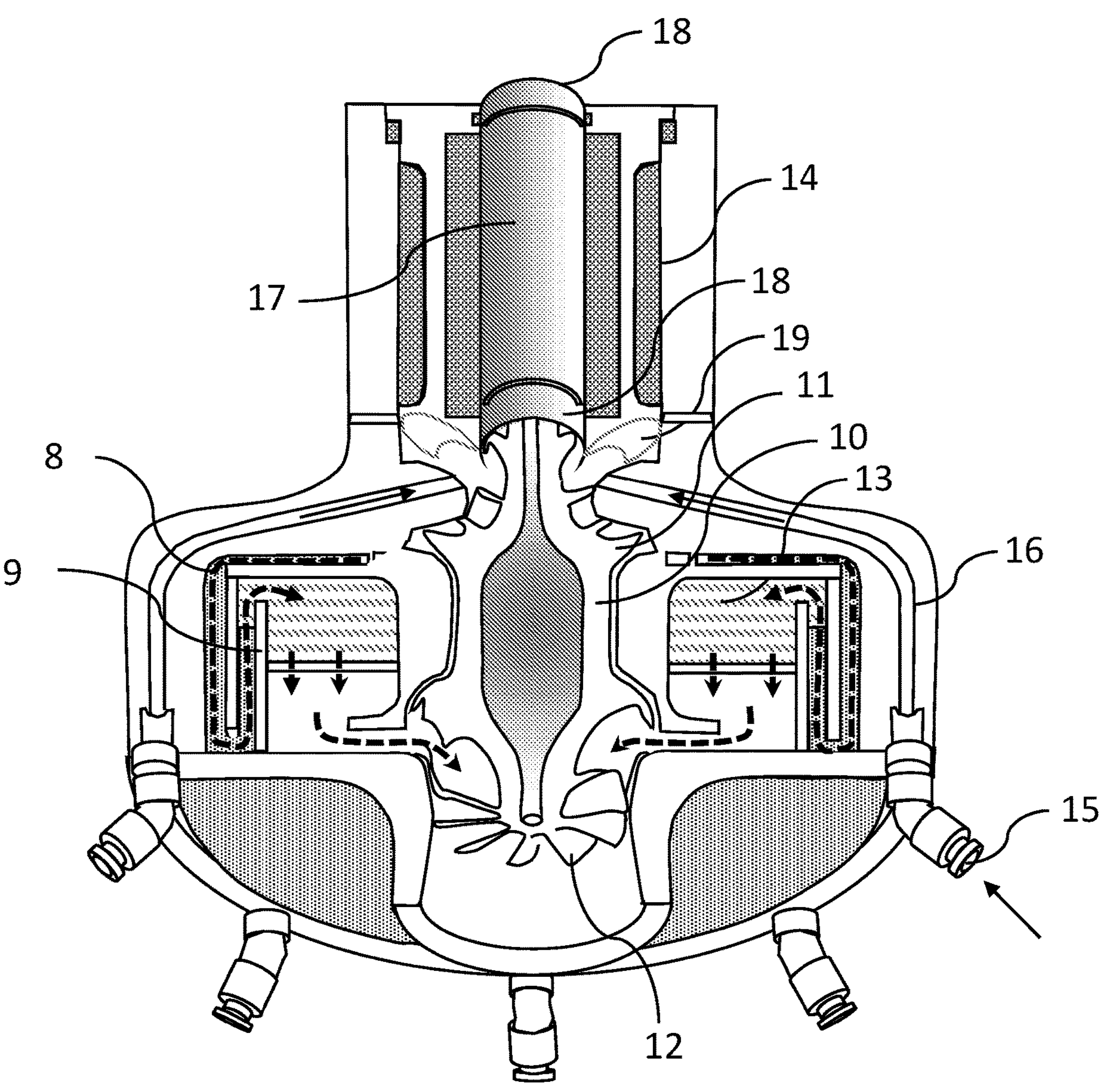
FIG. 1 illustrates schematically an exemplary cut-away illustration of a complete ultra-micro gas turbine generator (UMGT), incorporating novel features described in the present disclosure.

Reference is now made to FIG. 1, which illustrates schematically an exemplary cut-away illustration of a complete ultra-micro gas turbine generator, herein after called a UMGT, though UMGTG may be considered to be a more complete description, incorporating the novel features described in the present disclosure. In common with larger industrial gas turbine generators, the UMGT comprises a single shafted rotating impeller 10, on which are incorporated a compressor fan 11 and a turbine 12, with a combustion chamber 13 for generating the heated gases for providing the mechanical energy for driving the turbine, and an electric generator 14 for producing electricity from the shaft rotation energy. However, because of the special requirements of the UMGT, generally related to the very small dimensions of the device, the comparison with conventional industrial gas turbine generators is limited to those general features, and a number of substantial technical problems have to be overcome, before a practical UMGT can be proposed.

The solutions to at least some of the technical problems solved can be seen in the details of FIG. 1, and each of these particular features and the problems which they come to solve will be discussed further hereinbelow. Besides the impeller-compressor-turbine-generator assembly shown in FIG. 1, there are also shown the fuel injection ports 15 and fuel supply lines 16, leading to mixing chambers at the entrance to the compressor 11, where the fuel is mixed with air from the air inlets 19, and the mixture is compressed. The compressed air/fuel mixture is then directed through a narrow jacket in contact with the combustion chamber outer walls, such that the compressed mixture is pre-heated by contact with the combustion chamber walls. The curved arrows 8 show the direction of the flow of the air/fuel mixture. The combustion chamber 13 comprises a honeycomb porous ceramic region in which the combustion itself takes place. Such a combustion chamber provides more uniform flame generation. The combustion chamber 13 is supplied with a premixed low equivalence ratio fuel/air mixture, typically in the region of 0.2 to 0.3, though not limited thereto. Use of such a low equivalence ratio mixture generates oxygen rich combustion and lowers the exhaust gas temperatures. The hot combustion product gases then exit the combustion chamber, as shown by the continued dashed lines, expanding rapidly and driving the turbine blades 12, and giving up their energy to the turbine shaft, before being expended into the atmosphere at the turbine outlet. These exhaust gases can also be used to gain additional thrust in suitable flying platform settings. The electric generator 14, driven by the turbine 12 uses permanent magnets 17 mounted within the end section of the rotor remote from the turbine, and the electric current is induced into a static set of copper coils surrounding the rotor. Finally, the entire rotary shaft 10, in the form of a thin-walled hollow cylindrically shaped cavity, is typically carried on a pair of ball bearings 18, mounted on the ends of the generator rotor, though, as will be shown below, an air bearing configuration may be used.

A major application for the devices of the type shown in FIG. 1 are small drones, which, if electrically powered, have a battery weight of 200 g-1000 g and maximum flight speed of 50 km/h. The useful payload, besides the battery, of this drone category is 200 g-1500 g, making such drones a viable option for long distance, light-weight, delivery as well as for surveillance mission with installed cameras or infrared sensors. The maximal take-off weight for a typical small scale drone, including battery, payload and fuel tank, is up to 10 kg. Thus, there are three methods of powering such a drone:

(a) Electric motors powering rotor fans, and drawing current from a battery, which can be charged by use of the UMGT device.

(b) A hybrid system to convert the chemical energy of the fuel into electric power output that is then stored in a battery buffer and later converted into thrust via fans powered through electric motors.

(c) By the kinetic energy at the exhaust of a small jet engine, such as the compressor and turbine part of the UMGT device, used directly to provide the thrust. In this method, using a configuration of 4 micro jet engines, a thrust of up to 2.5 kg would be needed from each one of the engines in order to power a 10 kg drone, thereby replacing the 4 quad-copter rotors.

Further to the above overview in FIG. 1 of the main component parts of the UMGT of the present disclosure, novel solutions to the problems involved are now described.

As mentioned in the Background section, in order to achieve the desired specific energy (the energy output per unit weight of the device, typically measured in Watt-Hours/kg), the rotating shaft assembly must spin at a very high speed, ranging up to the order of 500,000 rpm or even more. This presents severe technical difficulties and mandates the creation of novel rotor-dynamic solutions to achieve these goals.

In the first place, because of the need for minimal dimensions, both in the interest of compactness, but also in order to shift the natural bending frequencies beyond operational excitations, all three active components of the presently disclosed UMGT, namely, the compressor, the turbine and the generator, are constructed as a unitary element from a single piece of material. This obviates the need to attach separate components, each manufactured for ease of construction and maximum efficiency, as is done in large scale gas turbine generator installations, and as used in prior art UMGT devices. The problems and additional hardware required for attachment of such tightly dimensioned miniature components, which has been one of the reasons for the failure of prior art UMGT generators to become commercially viable, is thereby obviated. In the presently disclosed devices, such a unitary construction is achieved by manufacturing all of the three rotary components on a single-piece rotary impeller, thereby avoiding the need for any connecting elements to attach the three components to each other.

Because of the high temperatures generated in the turbine region, it is necessary to use a heat resistant ceramic material for constructing the rotary impeller. One suitable material is Silicon Nitride, which can withstand over 1200° C. Another ceramic material for construction of the rotary impeller, is zirconia, since it has lower heat conduction, enabling isolation of the heat of the turbine from the compressor and generator, both of which should be kept as cool as possible. Alternatively, a high-strength Nickel alloy, such as Inconel, Hastelloy, or similar can be used, as such alloys withstand high temperatures of over 1,000° C. while maintaining their strength. The separate components of prior art UMGT devices have previously been manufactured by additive manufacturing methods. The length and complexity of the shape of the single-piece rotary impeller of the present application can advantageously be achieved by use of Lithographic-based Ceramic Manufacturing (LCM). This manufacturing process currently allows 3D-printing of Zirconia, Alumina, and Silicon Nitride, all of which are ceramics which withstand very high temperatures. LCM is an additive manufacturing technology based on digital light processing (DLP) of photopolymers. Details of the process can be shown in the article entitled "LCM—Technology" published by Lithoz GmbH, of Vienna Austria, which can be found at http://www.lithoz.com/en/additive-manufacturing/lcm-technology.

As described in the Lithoz article, a transparent resin holds the raw material, which is a slurry consisting of the ceramic powder and a light-sensitive photopolymer, which solidifies when exposed to ultra violet light. To create a new layer of solid material, the build platform moves up, a wiper establishes a thin film of slurry and a mask pattern is projected onto the bottom of the resin. The mask may be generated by an array of micro mirrors which function as pixels irradiating incremental spots on the build plate by reflecting the light source. If a certain mirror is activated, immediate polymerization is triggered, and the slurry film is solidified at the desired location. Thus, an incremental layer of a three-dimensional geometry is generated. Successive layers are solidified, until the ceramic green body is built. LCM therefore offers desirable geometric flexibility, allowing cavities and undercuts, which cannot be achieved with conventional manufacturing technologies. Layer heights can be as small as 10 microns, while printing resolution currently available reaches as little as 32 microns. As all pixels of the build plane are processed at the same time, it is possible to print multiple parts with different geometry during one printing process. The technology is specifically advantageously applied to small scale parts.

After 3D printing the green body, the photopolymer residuals which operate as binder, are removed in the de-binding process by curing the parts at an elevated temperature. Thereafter, the parts are sintered, which results in a high density and high surface finish, typically as good as 0.5 microns. Parts printed with LCM technology can achieve the same material properties as injection molded parts. The LCM process for the manufacture of temperature resistant ceramic parts, offers the following advantages over components manufactured by conventional methods:

1. The superior material properties of technical ceramics.
2. Good design freedom.
3. Substantially reduced costs, since the tools are merely lithographic images.
4. Parallel printing of different designs.
5. High quality surface finish.
6. The agglomeration of material is avoided, hence preventing cracks during de-binding and sintering.

Figure 2:
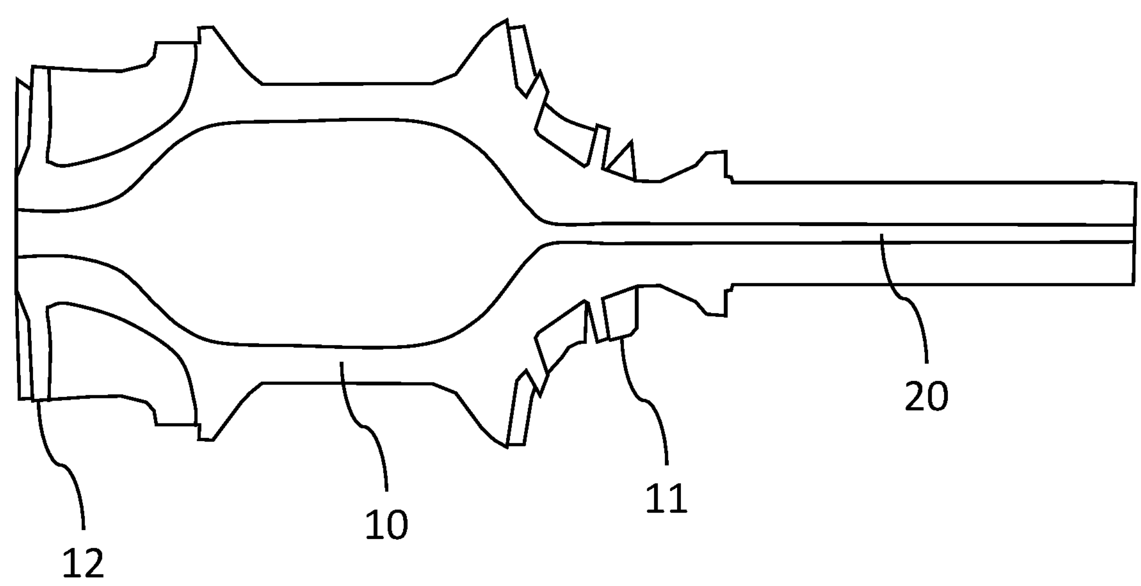
FIG. 2 shows schematically a cross-sectional illustration of the shape of one example of the single-piece ceramic core of the UMGT described in FIG. 1.

Reference is now made to FIG. 2, which is a cross-sectional schematic illustration of the shape of one example of the single-piece ceramic core of the type of UMGT described in the present disclosure, showing how the turbine 12, and compressor 11 are attached by means of a cavity shaped hollow impeller 10 or rotor shaft. Use of such a hollow connecting shaft for the impeller significantly improves the rotor-dynamic behavior of the UMGT over use of a solid shaft, besides simplifying the manufacturability of a single part rotor. The main concern with such an ultra-high rotational speed rotor is the requirement not to cross the first bending mode of the impeller during operation. Use of a hollow shaft geometry enables reduction in the mass and hence, the first bending mode frequency is increased, contributing to stable operation at high speeds, without approaching the first bending mode frequency. This effect can be additionally amplified by adding fin structures to the cavity in axial or mixed axial-radial direction. The shape of the cavity and/or fin structures can then be used to control the modal frequency of the device. This way, modal behavior can be tailored to the severity of the operating conditions of the UMGT, which otherwise may be severely constrained by compressor, turbine and shaft geometry. At the end of the rotor remote from the turbine, is a cylindrical shaft, on which rotary bearings 18 may be mounted for supporting the rotor rotation, as shown in FIG. 1 The generator magnets 17 are mounted on this cylindrical shaft section of the rotor. The cylindrical shaft advantageously has a hollow bore 20, which can be used for providing air cooling through the hollow core, as will be further described hereinbelow. This configuration has not been previously used in conventional large-scale gas turbine designs, due to its tendency to result in low cycle efficiency, which is unacceptable in larger machines where other alternatives exist. In small-scale machines, different criteria drive the design viability. Throughout this disclosure, the terms "impeller" and "rotor", though sometimes having different connotations in specific fields of gas turbine technology, may be used interchangeably, and are intended to relate to the complete, one-piece, rotating assembly including the electric generator rotor, the bearing mounting locations, the compressor and the turbine sections.

Figure 3:
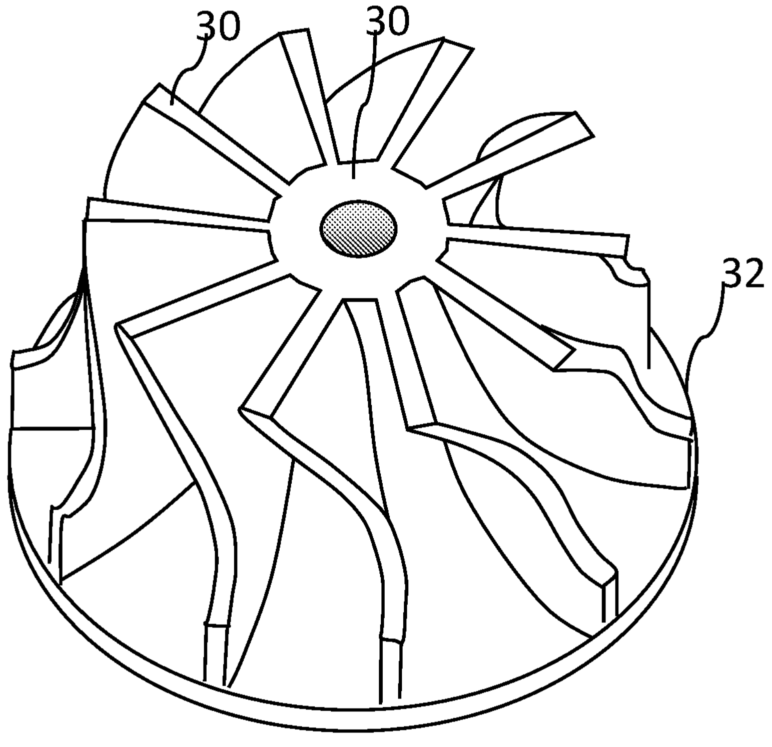
FIG. 3 illustrates one exemplary implementation of a turbine for use in the device shown in FIG. 1.

Reference is now made to FIG. 3, which illustrates one exemplary implementation of a turbine 12 for use in the device shown in FIG. 1 with its rotor shown in FIG. 2. The turbine design has a cut-back leading edge 30 both for its core and for the blades, being the plane surface of the turbine that is generated as the initial layers of the turbine are deposited on the planar build plate of the 3-D printer. Such a turbine design, though it may very slightly compromise aerodynamic performance, is mandated if additive manufacturing is used to produce the device.

Figure 4:
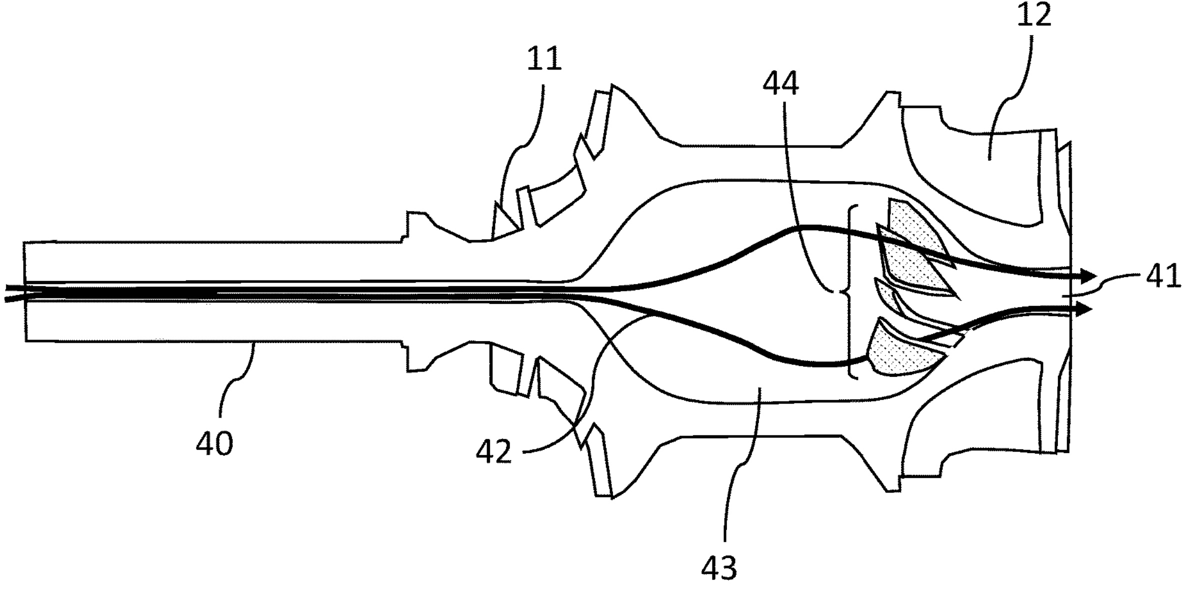
FIG. 4 illustrates one exemplary implementation of the cooling methods used in the UMGT shown in FIGS. 1 and 2.

Reference is now made to FIG. 4, which illustrates one exemplary implementation of the cooling methods used in the UMGT shown in FIGS. 1 and 2. There are a number of aspects of the presently designed rotor, all of which are directed at optimal cooling configurations. The primary need is to provide sufficient cooling in the region of the turbine, through which the combustion products of the fuel/air mixture flow. However, it has been shown that for the small scale devices described in this disclosure, heat transfer effects from turbine 12 to compressor 11 have significant impact on compressor performance and pressure ratio. Therefore, the surface temperature of the compressor wheel needs to be kept as low.as possible. By use of a comparatively thin-walled hollow impeller geometry 10, the heat conducting cross-section from the turbine region to the compressor region is reduced, directly leading to lower compressor surface temperature and hence promoting a more efficient thermodynamic cycle.

As mentioned above, the primary cooling function required is for application in the region of the turbine. Material selection for the UMGT rotor device is significantly narrowed due to the high turbine inlet temperatures and internal stresses. Additive manufacturing technology using only steel alloys, at a scale and resolution necessary for a UMGT, is currently limited to materials which can barely endure more than 800° C., or so. High operational temperature Nickel-based alloys, such as Inconel, Hastelloy, or similar, can be used at temperatures of somewhat over 1,000° C., depending on the particular alloy used. Temperatures significantly higher than 800° C. are required for the UMGT turbine region, and hence the use of ceramic additive manufacturing. With conventional manufacturing technology, active cooling of turbine blades has not been achieved for devices of this scale. It is the ability of additive manufacturing to produce complex geometries within cavities, even using ceramic materials, that enable the UMGT configurations of the present disclosure, inter alia, to overcome this temperature challenge.

Successful turbine cooling can be achieved by the novel methods and structures of the present disclosure, in one of two ways. In the exemplary rotor body shown in FIG. 4, the electric generator shaft 40 is hollow and there is also an opening 41 in the center of the turbine 12, such that a clear flow path 42 is formed from the inlet at the generator end to the turbine outlet. Two factors now contribute to the flow of cooling air through this internal passageway. Firstly, the high speed flow of exhaust gases out of the turbine generates a low pressure region at the turbine outlet of the hollow passageway, thus sucking cooling air from the generator end, and through the central space 43 of the rotor, which can be shaped to optimize heat transfer from the cavity walls. In addition, internal blades 44 formed within the cavity 43, which, being part of the impeller, rotate at high speed, and also generate active cooling by creating a suction flow from the cavity inlet to the cavity outlet. Additionally, within the cavity 43, the internal blades 44 cause rotational motion of the internal flow profiles, thereby increasing the cooling effect. Both of these effects are enabled only by the ability of the additive manufacturing technology used, to produce intricate and accurately formed internal features, such as those of the internal blades 44. Since the turbine cooling reduces blade temperature, stress demands on the material of the impeller are more easily met. Moreover, the generator shaft 40 is cooled by the internal cooling air flow, which is an important requirement for stable bearing operation, the bearings being optionally mounted on the ends of the shaft 40. Additionally, the internal blades 44 not only contribute to the formation and distribution of the cooling air flow, but also increase the stiffness of the impeller body, thus reducing the effect of bending modes which would limit performance.

Figure 5:
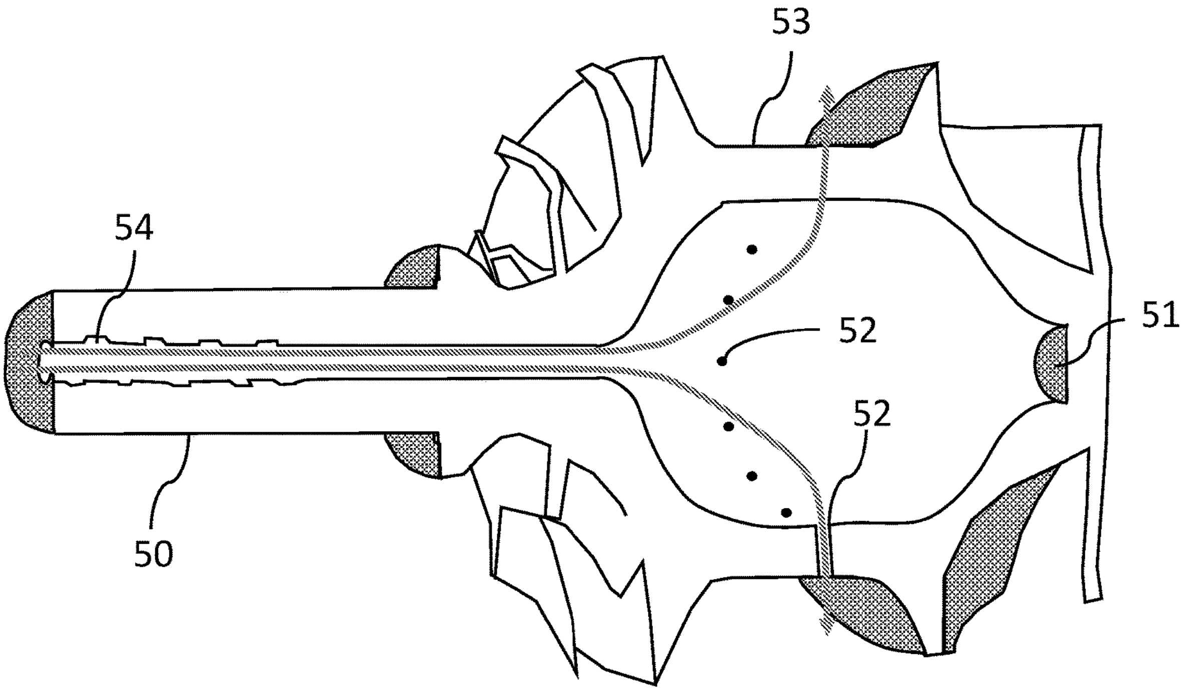
FIG. 5 illustrates schematically, an alternative air flow cooling and aerostatic bearing stabilization method to that shown in FIG. 4, using a high pressure helical groove compressor.
Figure 6:
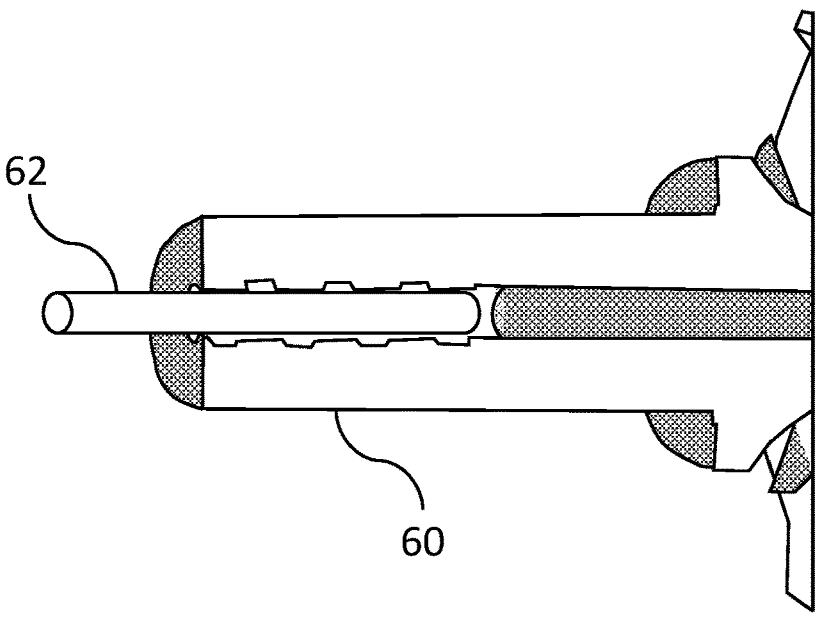
FIG. 6 is a schematic illustration showing how the stator inserted into the bore enables the helical groove shown in FIG. 5 to compress the air.

The cooling embodiment shown in FIG. 4 utilizes a low air pressure difference, but a high flow rate for the cooling air flow. Reference is now made to FIGS. 5 and 6, which illustrate schematically, an alternative air flow cooling method, using a high differential air pressure but a lower flow rate configuration. This is achieved by using a high pressure, helical groove screw compressor 50 within the bore of the impellor, preferably in the generator shaft 40 region. As the impellor rotates at high speed, the helical groove structure 50 collects the air from between the stator core and the helical screw grooves in the internal wall 40 of the bore of the impellor, and compresses it by forcing it down the gap in the bore to the cavity structure. The exemplary cavity shown in FIG. 5 does not have an exit in the center 51 of the turbine structure. Instead, outlet holes 52 or porous section in the cavity wall enable the high pressure air to leave the cavity, cooling the turbine region during its flow path. Outlet holes or porous sections in the turbine blades can also be used to cool the turbine by a fluid film, similar to film cooling in conventional high-pressure turbines.

FIG. 6 is a schematic illustration showing how the stator inserted into the bore and supporting the generator end of the rotary shaft, enables the helical groove shown in FIG. 5 to compress the air. Such a flow of air out of the cavity holes 52, as shown in FIG. 5, can then, in combination with micro groves on the shaft or on the casing, also facilitate the establishment of an air film to support the impeller. In previous UMGT devices, aerostatic bearings were proposed to enable the impeller to operate at high speeds with high stability. However, aerostatic bearings require high pressure air supply, and in prior art designs, this had to be established by an external source, which conflicts with the requirement of a portable power source. Therefore, the inclusion of a screw compressor 50 into the impeller of the gas turbine, may use the high pressure air supply thus generated, after performing at least part of its cooling functions, for the support medium of air bearings. This feature is different from the use of air bearings in prior art devices, which was only possible by use of an external air supply. As emphasized previously, in connection with the internally formed flow generating blades 44, it is the novelty of the use of by additive manufacturing techniques to form the impeller, that enables the construction of the internal features of the impeller that enables the simple use of air bearings for supporting the impeller rotation.

One possible location for such air bearings could be around the girth 53 of the cavity section of the impeller, which would appear to be a naturally useful location, being situated in the central region of the rotating body, and therefore most supportive to prevent bending modes which would limit high rotational speed performance. Additionally, that is the location from which the pressurized air would be emitted from the air flow escape holes 52, which would be directly into the region of support surface 53 of the air bearing. Because of the extremely high rotational speed of the impeller, and the very small gap in the bearing, such air bearings may be highly susceptible to radial weight distribution of the rotor, thereby limiting the rotary speed achievable before the first bending mode threshold is crossed. Therefore, the exemplary implementation of the UMGT shown in FIG. 2 uses a pair of ball bearings 18, preferably ceramic-based, in the shaft region remote from the turbine end of the impeller, providing cantilevered support of the impeller. This region is the coolest contact region of the device, and hence provides the optimum lifetime for the ceramic ball bearings. However, this configuration does not rule out the possibility of using other bearings and other bearing locations for operation of the device.

Figure 7:
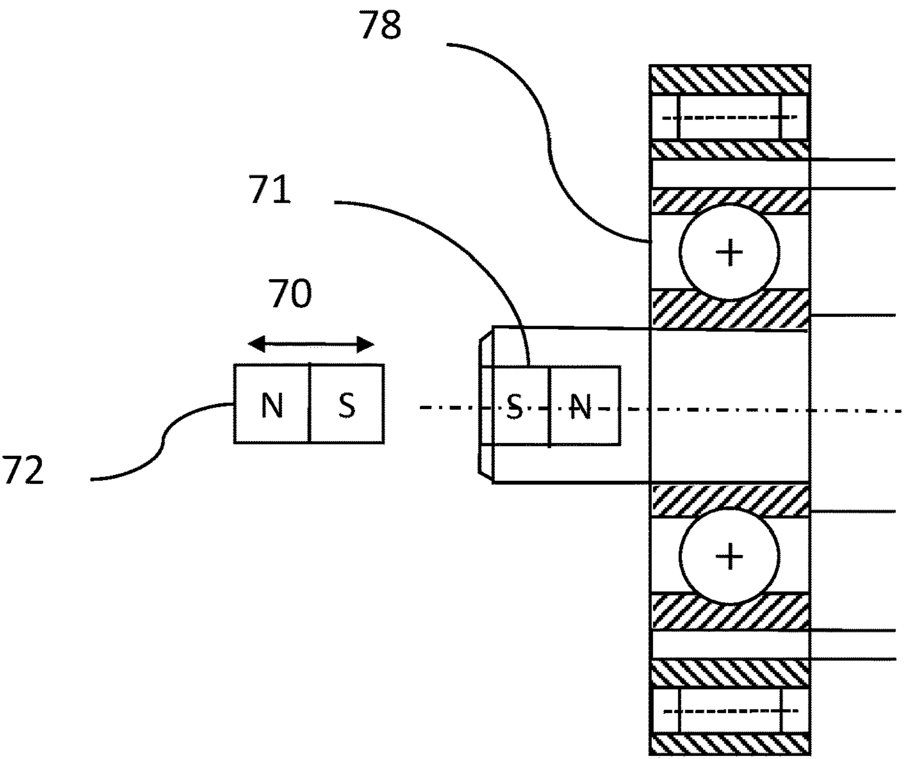
FIG. 7 illustrates schematically a permanent magnet compensation arrangement used to provide axial thrust compensation.

Since the UMGT is a static engine, there is a need to stabilize the rotor axially, in order to avoid unnecessary wear on the bearings arising from the axial thrust generated by the rotating compressor and turbine elements. This requirement is generally unimportant in an aero-jet engine whose whole function is to provide axial thrust in one direction. In larger scale gas turbine engines, when axial stability is important, a balance piston or labyrinth seal, driven by a small level of bleed air, is commonly used to provide axial thrust compensation. However, such a construction is problematic in the very small scale UMGT devices described, such that an alternative axial thrust compensation method must be used. Reference is therefore made to FIG. 7, which illustrates schematically a permanent magnet compensation arrangement, used to provide axial thrust compensation, which prevents the axial thrust being subjected to the bearings, reducing their lifetime. The system comprises a rotating magnet 71 located at the outer end of the rotary shaft, and facing it, a movable magnet 72, aligned such that its magnetic field generates an axial force on the rotating magnet 71, and hence on the rotor shaft. The level of that axial force is dependent on the distance apart of the magnet faces, such that motion in the axial direction 70 of the moveable magnet can control the axial compensation force applied to the rotor shaft. Since the axial force applied because of the difference in pressures generated between the compressor and the turbine, is in the direction towards the left of the drawing of FIG. 7, the magnets should be mutually aligned to provide a compensating force to the right, and hence should have like poles facing each other. Since the UMGT is generally a constant speed device, the approximate force required for compensation at the nominal speed is known, such that the compensation configuration is considerably simplified. However, such a compensation scheme would nevertheless require a speed or force sensor to determine the axial force, a feedback circuit for providing the correction signal required, and an electromechanical drive system for inputting the correction signal and providing motion 70 to the compensation magnet to maintain minimal axial thrust on the rotating impeller. For a limited motion range, it is possible that a piezoelectric motion element rather than an electromagnetic stepping motor could be used to control the position of the compensating magnetic field. Alternatively, the position of the opposing magnet and hence the compensating axial force could be determined predictively, since the UMGT is intended to be a constant speed device, and the compensation force can thus be determined predictively for the intended operating speed.

However, any of these systems involve electronic thrust measurement, an electronic feedback circuit and a mechanical motion system, all of which increase the complexity of the device. As an alternative, axial thrust compensation system based on eddy-current induction into a static conductive element can be used in the present devices. In the UMGT, the bearings have to carry the axial load resulting from the axial force induced by pressure difference in compressor and turbine. In small scale gas turbines, higher rotational speeds are necessary and additionally, scale effects result in enhanced magnetic forces. These two phenomenon can be utilized for this type of thrust compensation. Several magnets 78 or a single sectioned magnet are attached to the impeller shaft, such that at high speed, an alternating magnetic field is established which induces eddy currents into a conductive stator, not shown in FIG. 7, located in proximity to the rotating magnet or magnets. The eddy currents are used to generate an opposing magnetic field and hence axial thrust compensation to the rotating impeller. This arrangement leads to axial thrust compensation that is proportional to operating speed, and since operating speed is proportional to compressor-turbine pressure difference, which determines the level of the axial thrust, the system is self-regulating, and requires no feedback circuitry or axial moving parts.

Figure 8:
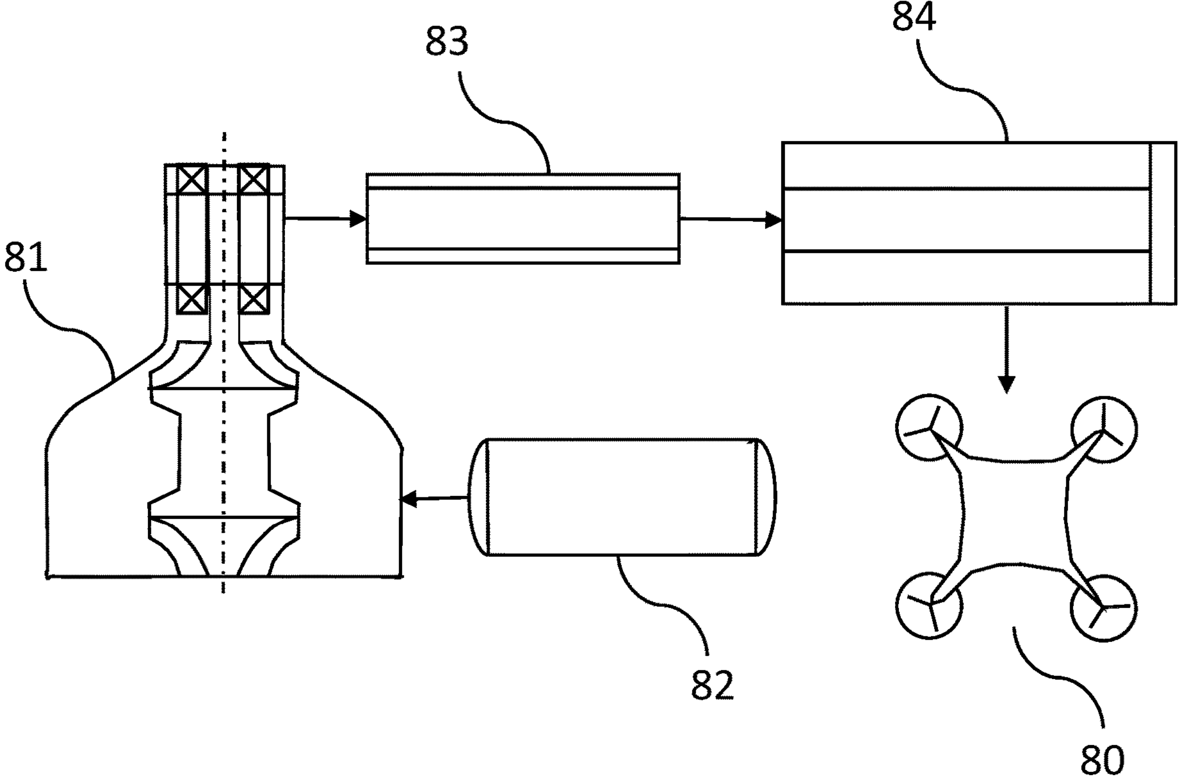
FIG. 8 illustrates schematically how the UMGT device is integrated into a schematic rendering of a complete hybrid power supply, such as for a drone propulsion.

Finally, reference is made to FIG. 8, which illustrates schematically how the UMGT device 81 is integrated into a schematic rendering of a complete hybrid power supply, for instance to increase the flight time of an unmanned airborne vehicle (UAV), such as a drone 80. The UMGT device is supplied with fuel from an on-board container 82, and generates electricity which is converted in the power electronics unit 83 to the on-board battery set 84, for powering the motors of the drone 80. The exhaust gases can also be used to provide directional thrust to the flying platform.

It is appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

I claim:

1. A gas turbine system, comprising:

an impeller element constructed of a single piece of material, and having a hollow shell structure comprising a compressor element and a turbine element, the hollow shell structure having an interior comprising a cavity portion and a hollow axial bore portion, the cavity portion having a diameter greater than the largest diameter of the hollow axial bore portion;

at least one bearing configured to support the impeller element such that the impeller element can rotate about its axis; and a combustion chamber external to the impeller element, and adapted to receive a fuel/air mixture whose combustion products are directed through the turbine element, wherein the hollow axial bore portion comprises an axial inlet opening that is concentric to the cavity portion of the impeller element and adapted to enable a flow of air to pass from the outside environment, along the length of the hollow axial bore portion, and through the cavity portion of the impeller element.

2. The gas turbine system according to claim 1, wherein at least part of the flow of air through the cavity portion of the hollow shell structure of the impeller element is adapted to provide cooling to a region of the turbine of the impeller element.

3. The gas turbine system according to claim 1, wherein at least part of the flow of air through the cavity portion of the hollow shell structure of the impeller element is emitted therefrom to provide cooling to the at least one bearing on which the impeller element rotates.

4. The gas turbine system according to claim 1, wherein the impeller element further comprises an electricity generator core, such that the system can generate electricity.

5. The gas turbine system according to claim 1, further comprising an exhaust gas nozzle to generate directional thrust from the kinetic energy of exhaust flow from the turbine element.

6. The gas turbine system according to claim 1, wherein the cavity portion of the hollow shell structure has an array of blades formed internally, the blades being aligned such that the internal flow of air is circulated through the cavity portion of the hollow shell structure.

7. The gas turbine system according to claim 6, wherein the position and geometry of the blades are selected to control the modal frequency of the hollow shell structure when rotated.

8. The gas turbine system according to claim 1, wherein the impeller element further comprises at least one magnetic element, and wherein a static conductive element is disposed in close proximity to the at least one magnetic element, such that rotation of the impeller element induces eddy currents in the static conductive element, causing compensation for axial forces generated by the rotating compressor element and turbine element.

9. The gas turbine system according to claim 1, wherein the hollow shell structure is generated by an additive manufacturing method.

10. The gas turbine system of claim 9, wherein the turbine element has blades with a planar end surface, thereby enabling production of the turbine element by an additive manufacturing method.

11. The gas turbine system according to claim 1, wherein the hollow shell structure is constructed either of a ceramic material, or of a high-strength nickel alloy.

12. The gas turbine system according to claim 8, wherein the hollow shell structure has at least one opening in the center of the turbine element adapted to enable the flow of air drawn from the outside environment into the impeller element through the axial inlet opening in the hollow axial bore portion of the hollow shell structure of the impeller element, to pass through and out of the impeller element.

13. The gas turbine system according to claim 12, further comprising a helical groove compressor formed within the hollow axial bore portion of the hollow shell structure, such that the flow of air is pressurized and pumped by the helical groove compressor from the outside environment along the length of the hollow axial bore, and through the cavity portion of the hollow shell structure of the impeller element.

14. The gas turbine system according to claim 12, wherein the at least one bearing is an air bearing, and at least part of the flow of air from the outside environment passing through the impeller element is adapted to provide at least one of (i) cooling to a region of the turbine of the impeller element or (ii) support and cooling to the at least one air bearing on which the impeller element rotates.

15. The gas turbine system according to claim 12, further comprising an array of blades formed internally within the hollow shell structure, the blades being aligned to generate suction such that the flow of air is drawn into the hollow shell structure through the axial inlet opening in the hollow axial bore portion of the hollow shell structure.

16. The gas turbine system according to claim 12, wherein the at least one opening in the center of the turbine element of the hollow shell structure, is further adapted to enable exhaust flow from the turbine element to generate suction to draw the flow of air from the outside environment of the impeller element to pass through the hollow shell structure.

17. A method of forming elements of a gas turbine, the method comprising:

forming an impeller element comprising a turbine and a compressor formed on a hollow shell structure, the hollow shell structure enabling a flow of air inside the impeller element, an impeller element constructed of a single piece of material, and having a hollow shell structure comprising a compressor element and a turbine element, the hollow shell structure having an interior comprising a cavity portion and a hollow axial bore portion, the cavity portion having a diameter greater than the largest diameter of the hollow axial bore portion, at least one bearing configured to support the impeller element such that the impeller element can rotate about its axis, and a combustion chamber external to the impeller element, and adapted to receive a fuel/air mixture whose combustion products are directed through the turbine element, wherein the hollow axial bore portion comprises an axial inlet opening that is concentric to the cavity portion of the impeller element and adapted to enable a flow of air to pass from the outside environment, along the length of the hollow axial bore portion, and through the cavity portion of the impeller element, and wherein the impeller element is formed by an additive manufacturing method.

18. A method of forming elements of a gas turbine, the method comprising:

forming an impeller element comprising a turbine and a compressor formed on a hollow shell structure, the hollow shell structure enabling a flow of air inside the impeller element, wherein the impeller element is formed by an additive manufacturing method.

19. The method according to claim 18, wherein the hollow shell structure is formed either of a ceramic material, or of a high-strength nickel alloy.

20. The method according to claim 18, wherein the additive manufacturing method is characterized by the impeller element having a planar end surface at the turbine end of the hollow shell structure.

21. The method according to claim 18, wherein the flow of air inside the impeller element is drawn from outside the impeller element to pass through the impeller element.

* * * * *